United States Patent Office 3,686,116
Patented Aug. 22, 1972

3,686,116
SEMI-PERMEABLE MEMBRANES AND
THEIR USE
André Rio, Lyon, France, assignor to
Rhone-Poulenc S.A., Paris, France
No Drawing. Filed Sept. 30, 1969, Ser. No. 862,522
Claims priority, application France, Oct. 2, 1968,
168,446
Int. Cl. B01d 13/00
U.S. Cl. 210—23                                                4 Claims

ABSTRACT OF THE DISCLOSURE

Polyamides of diamines with 5 - amino-isophthalic acid make semi-permeable membranes of good stability and salt rejection.

---

The present invention relates to semi-permeable membranes and their use.

Semi-permeable membranes are permeable to solvents and impermeable or of low permeability to solutes when they are brought into contact with a solution. Depending on the conditions under which they are used, semi-permeable membranes can find two types of applications, namely direct osmosis or reverse osmosis. Thus, if an aqueous solution of a salt is brought into contact with one face of a semi-permeable membrane the other face of which is in contact with pure water, it is found that the pure water passes through the membrane and dilutes the saline solution, giving rise to the phenomenon of direct osmosis. If a pressure greater than that required to stop the passage of pure water into the saline water, the latter being called the osmotic pressure, is applied to the saline solution, it is found that the direction of flow of the water is reversed. Water diffuses across the membrane carrying no solute, or practically no solute, with it, depending on the capacity of the membrane to stop the solute. This is reverse osmosis, and it can be utilised for separating a solvent from a solute and more especially for desalinating sea water.

The most extensively used semi-permeable membranes are based on cellulose derivatives such as cellulose esters and ethers, especially cellulose acetate and ethoxycellulose. Despite their properties these membranes suffer from disadvantages inherent in their chemical nature. Their working life is limited because of their sensitivity to hydrolysis, which is particularly troublesome when they are used in the desalination of sea water.

There have now been found, and it is this which forms the subject of the present invention, semi-permeable membranes which are less sensitive to hydrolysis. These new semi-permeable membranes are made from polyamides containing a plurality of units of the formula:

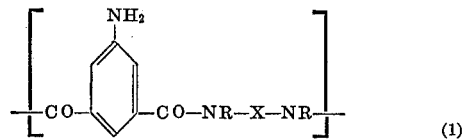

(1)

alone or in combination with units of the formula:

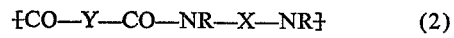

(2)

in which X and Y are the same or different and each represents a divalent organic radical, and R is hydrogen, lower alkyl, cycloalkyl of 5 to 6 ring carbon atoms, phenyl radical, lower alkyl-substituted phenyl, or aralkyl, and two R radicals in a unit of formula:

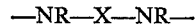

may be joined to form a heterocyclic ring containing the 2 indicated nitrogen atoms. A lower alkyl radical is to be understood as an alkyl radical having 1 to 4 carbon atoms. Several different radicals X and Y of different nature can be present in these polymers.

To prepare the polyamides of which the new membranes are made, 5-amino-isophthalic acid dichloride in which the amine group has beforehand been blocked can be used as the starting material. A polycondensation of this compound, optionally combined with one or more acid chlorides of formula $Y(COCl)_2$, with one or more polyamines of formula $X(NHR)_2$ is carried out. Finally, in a last stage, the polymer is subjected to a treatment to liberate the amine groups.

The amine group is best blocked at the diacid stage, that is to say directly in the 5-amino-isophthalic acid, in accordance with any known process such as for example one of those described in "Advances in Organic Chemistry," 3, pp. 160–184 (1963). Among these various processes, experience has shown that blocking with o-phthalic anhydride, described on page 179 of the abovementioned work, produces the best results during the polycondensation. This type of blocking can furthermore be effected in excellent yields. Thus reaction of 5-amino-isophthalic acid with o-phthalic anhydride in acetic acid yields 5-(2'-carboxy-benzamide)-isophthalic acid which on treatment with phosphorus pentachloride or thionyl chloride allows the dichloride of 5-phthalimido-isophthalic acid to be obtained practically quantitatively.

The dichloride of 5-amino-isophthalic acid with the blocked amine group is subjected to the polycondensation, with or without one or more other acid polychlorides. Suitable such other polychlorides are the polychlorides of oxalic, maleic, succinic, glutaric, adipic, azelaic, cyclohexane-1,4-dicarboxylic, benzene-1,3-dicarboxylic and benzene-1,4-dicarboxylic and naphthalene-1,8-dicarboxylic acids. Thus, Y is preferably a single bond, —CH=CH—, alkylene of 2 to 8 carbon atoms, cyclohexylene, phenylene, or naphthylene.

The amines used to effect the polycondensation can be any aliphatic, cycloaliphatic, heterocyclic or aromatic polyamine. 1,2-diamino-ethane, 1,2-diamino-propane, 1,3-diamino-propane, 1,6-diamino-hexane, 1-amino-2-aminoethyl-cyclopentane, 1,3-diamino-cyclohexane, 1,3-diaminomethyl-cyclohexane, piperidine, piperazine, 1,3-diaminobenzene, 1,4-diamino-benzene, 4,4'-diamino-biphenyl, 4,4'-diamino-diphenyl-ether and 4,4'-diamino-diphenylmethane may, for example, be used, X is thus preferably alkylene of 2 to 10 carbon atoms, cyclopentylene, cyclohexylene, phenylene, or a group of formula:

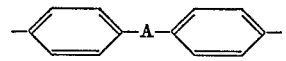

where A is a single bond, —O—, or —CH$_2$—.

The polycondensation can be carried out in solution. In this case it is preferable to carry out the process in a strongly polar solvent such as dimethylformamide, dimethylacetamide, N-methylpyrrolidone, dimethylsulphoxide, or tris-(dimethylamino)phosphine oxide, so as to keep the polymer in solution. The reaction is preferably carried out by introducing the polyamine or polyamines into the selected solvent and adding thereto the 5-amino-isophthalic acid dichloride with a blocked amine group, optionally together with other acid polychlorides, while stirring. The reaction temperature is maintained at a fairly low level, preferably between —20° C. and +20° C.

The polymer thus formed can be isolated from its solution by any known means such as the evaporation of the solvents or the addition of a precipitating agent such as, for example, water.

It is also possible to carry out the polycondensation in a heterogeneous phase in accordance with the process usually called interfacial polycondensation. In this type of reaction, the polyamine or polyamines are brought into aqueous solution as water-soluble salts, such as for example their hydrohalides, and this solution is added to a solution of the acid polychloride or polychlorides in a water-immiscible solvent, preferably an aromatic hydrocarbon such as benzene, toluene, or xylene, or a halogenated aliphatic hydrocarbon such as chloroform or 1,2-dichlorethane. The reaction medium with two liquid phases thus obtained is vigorously stirred at ambient temperature while aqueous sodium hydroxide or potassium hydroxide solution is added, until an alkaline pH persits in the aqueous phase. The resulting polymer precipitates and is recovered by filtration and washing.

The polyamides obtained by interfacial polycondensation or by polycondensation in solution are then subjected to a treatment to liberate the amine group. Any known method can be used for this purpose. However, where the protective group is a phthalimide group, it is advantageous to regenerate the amine group by the action of hydrazine hydrate in accordance with the method of Sheehan et al. J. Amer. Chem. Soc., 1856 (1949). This method consists of treating the polyamide with phthalimide groups with an aqueous solution of hydrazine hydrate at a temperature of about 60° C. in the presence of an acid or a base. It is generally more advantageous in the present invention to carry out the process in an alkaline medium because the phthalic hydrazide formed is soluble in this medium, which makes it possible to recover the polymer easily by simple filtration.

The amine group can be liberated either in the unconverted polymer or in a finished article. More particularly, in the present case the amine group can be liberated when the polymer has already been converted into a membrane.

The membranes of the invention are prepared in a manner which in itself known, for example, by casting a solution of the polyamide in a suitable solvent onto a support and then evaporating the solvent. It is also possible partially to remove the solvent and then to immerse the film with or without its support, in water or in a nonsolvent for the polyamide. This immersion can be carried out cold or hot and for a period which depends on the nature of the polyamide and of the properties desired of the membrane. After this treatment the membrane can be dried or used at once. Regardless of the technique employed, a pore-forming agent can be added to the solution of the polyamide, and this agent can consist of a finely divided solid which is insoluble in the solvent for the polyamide but is soluble in water or in a liquid which is a non-solvent for the polymer. This pore-forming agent is thereafter removed from the film by washing with an appropriate solvent. Sodium chloride and magnesium perchlorate are examples of such an agent.

The membranes of the invention are particularly suitable for reverse osmosis and are of value for the desalination of sea water. They are particularly easy to use because they can be stored without special precautions.

Furthermore, the only membranes currently used for the desalination of sea water are based on cellulose acetate. Despite the considerable flow rates which these allow to be achieved, it has been found that they suffer from a double disadvantage. First, their sensitivity to hydrolysis reduces their working life and makes it necessary to control the conditions of use rigorously, and secondly, the degree of salt rejection which they permit demands the use of desalination units working in at least two stages. Against this, the membranes according to the invention show remarkable chemical resistance under the conditions of desalination of sea water and, because of the excellent degree of salt rejection which they provide, make it possible to work in single-stage units, which is of considerable industrial value.

The membranes of the invention can be employed in a plane or tubular shape, for example as bundles of hollow fibres.

The following examples illustrate the invention.

EXAMPLE 1

19.8 g. of bis(4-aminophenyl)methane are dissolved in 150 cm.³ of N-methylpyrrolidone in a 500 cm.³ flask fitted with a stirrer, and cooled to −20° C., and 34.8 g. of 5-phthalimido-isophthalic acid dichloride are added all at once. The mixture is stirred for 2 hours 30 minutes at −10° C. and then for 1 hour at 0° C. A sample of the mixture is poured into water. The resulting polymer is filtered, ground, washed and dried. Its specific viscosity is 1.26 (measured at 25° C. with a 1% strength solution in N-methylpyrrolidone).

A part of the solution obtained above is used to prepare a membrane. For this, the solution is cast onto a smooth 40 x 22 cm. glass plate to a thickness of 0.1 mm. The whole is heated in an oven at 120° C. under a reduced pressure of 100 mm. of mercury, and kept for 30 minutes under these conditions, then for 30 minutes under a reduced pressure of 30 mm. of mercury, and finally for 5 hours under a reduced pressure of 0.5 mm. of mercury at 150° C. In this way a 20$\mu$ thick film is obtained, in which the amine group is liberated by treating the film for 20 hours at 25° C. with an aqueous solution containing 10% by weight of $Na_2CO_3$ and 10% by weight of hydrazine hydrate. The resulting film is rinsed with water to remove all traces of hydrazine carbonate.

A disc 9 cm. in diameter is cut from this film and is positioned under a grid forming the bottom of a reverse osmosis apparatus consisting of a vertical stainless steel tube 51 cm. high and of 8 cm. internal diameter, comprising a gas inlet, a pressure release valve, a safety valve and a magnetic stirrer. A sintered metal disc is located under the membrane and the assembly is held fixed by means of a silicone elastomer joint and a metal base equipped with fixing screws and a device for removing the water passing through the membrane.

The efficiency of the membrane in reverse osmosis is measured as follows. 1.5 l. of a 3.5 g./l. aqueous solution of sodium chloride are introduced into the apparatus, pressure is applied to the solution, and the flow rate of solution at the apparatus outlet, and the sodium chloride content of the solution, are measured in the usual manner. For the membrane described above, the flow rate of liquid across the membrane is 1 l./m.²/24 hours under a pressure of 90 bars and the degree of rejection of salt is 92.25%.

EXAMPLE 2

A membrane is prepared by casting the polyamide solution of Example 1 on the glass support and then drying at 90° C. under a reduced pressure of 1 mm. of mercury for 1 hour and immersing the film in water at 25° C. for 24 hours. A 40$\mu$ thick film is thus obtained, in which the amine group is liberated as in the preceding example. Under the reverse osmosis conditions of Example 1, under a pressure of 50 bars, this film shows a rate of flow of liquid of 0.21 l./m.²/24 hours and a degree of rejection of NaCl of 99.75%.

EXAMPLE 3

A membrane is prepared as in Example 2 but with 5 minutes immersion in water at 85° C. The rate of flow of liquid under the osmosis conditions of Example 2 is 0.23 l./m.²/24 hours and the degree of rejection of salt is 92%.

EXAMPLE 4

Three membranes are prepared as in Example 2 but with a drying period of 10 minutes at 90° C. under a reduced pressure of 1 mm. of mercury. These membranes are subjected to reverse osmosis conditions which are as in Example 1 with pressures of 50 bars, 100 bars and 140 bars respectively.

The rates of flow of liquid are 0.92 l./m.²/24 hours, 2.2 l./m.²/24 hours and 2.8 l./m.²/24 hours respectively; the degrees of rejection of NaCl are respectively 99.7%, 99.4% and 99.5%.

I claim:
1. A semi-permeable membrane made from a polyamide containing a plurality of units of the formula:

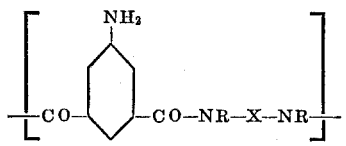

alone or in combination with units of the formula:

$\pm$CO—Y—CO—NR—X—NR$\pm$ in which X and Y are the same or different and each represents a divalent organic radical, and R is hydrogen, lower alkyl, cycloalkyl of 5 to 6 ring carbon atoms, phenyl, lower alkyl-substituted phenyl, or aralkyl and two R radicals in a unit of formula:

—NR—X—NR— may be joined to form a heterocyclic ring containing the two indicated nitrogens.

2. A membrane according to claim 1 in which X is

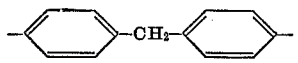

3. Process of reverse osmosis in which the semi-permeable membrane used is made from a polyamide containing a plurality of units of the formula:

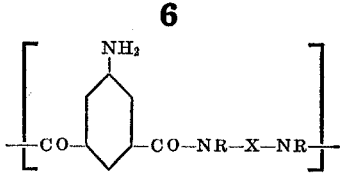

alone or in combination with units of the formula:

$\pm$CO—Y—CO—NR—X—NR$\pm$ in which X and Y are the same or different and each represents a divalent organic radical, and R is hydrogen, lower alkyl, cycloalkyl of 5 to 6 ring carbon atoms, phenyl, lower alkyl-substituted phenyl, or aralkyl and two R radicals in a unit of formula:

—NR—X—NR— may be joined to form a heterocyclic ring containing the two indicated nitrogens.

4. Process according to claim 3 in which the operation is one of desalination of aqueous sodium chloride.

References Cited
UNITED STATES PATENTS

| | | | |
|---|---|---|---|
| 2,252,554 | 12/1941 | Caruthers | 210—500 X |
| 3,063,966 | 11/1962 | Kwolek et al. | 260—32.4 X |
| 3,220,960 | 11/1965 | Wichterle et al. | 260—2.5 |
| 3,567,632 | 3/1971 | Richter et al. | 210—500 X |

FRANK A. SPEAR, JR., Primary Examiner

U.S. Cl. X.R.
210—321, 500